United States Patent
Mader

(10) Patent No.: US 10,208,531 B2
(45) Date of Patent: Feb. 19, 2019

(54) METHOD AND DEVICE FOR FILLING AN EDGE JOINT OF AN INSULATING GLASS ELEMENT WITH A SEALING COMPOUND

(71) Applicant: LISEC Austria GmbH, Seitenstetten (AT)

(72) Inventor: Leopold Mader, Neuhofen/Ybbs (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 395 days.

(21) Appl. No.: 14/937,377

(22) Filed: Nov. 10, 2015

(65) Prior Publication Data

US 2016/0060950 A1  Mar. 3, 2016

Related U.S. Application Data

(63) Continuation of application No. PCT/EP2014/077174, filed on Dec. 10, 2014.

(30) Foreign Application Priority Data

Dec. 10, 2013 (DE) ........................ 10 2013 020 557

(51) Int. Cl.
*E06B 3/673* (2006.01)
*B23B 3/00* (2006.01)

(52) U.S. Cl.
CPC ........ *E06B 3/67347* (2013.01); *E06B 3/6733* (2013.01); *E06B 3/67391* (2013.01); *B05D 2203/35* (2013.01); *B23B 3/00* (2013.01)

(58) Field of Classification Search
CPC .......................... E06B 3/67347; E06B 3/67391
See application file for complete search history.

(56) References Cited

U.S. PATENT DOCUMENTS 5,136,974 A     8/1992 Lisec
8,878,051 B2 *  11/2014 Mader .................. E06B 3/6775
                                                                126/704

FOREIGN PATENT DOCUMENTS

| CN | 1358253 A | 7/2002 | |
| CN | 101365850 A | 2/2009 | |
| DE | 2309295 A1 * | 9/1974 | ......... E06B 3/67343 |
| DE | 2846785 C2 | 7/1984 | |
| DE | 4009441 A1 | 10/1990 | |
| DE | 4136653 A1 | 5/1993 | |
| DE | 69629929 T2 | 5/2004 | |

(Continued)

*Primary Examiner* — Michael P. Rodriguez
(74) *Attorney, Agent, or Firm* — Edell, Shapiro & Finnan, LLC

(57) ABSTRACT

A strand of sealing compound is expelled from a nozzle into an edge joint of an insulating glass element to form around it a contiguous sealing compound bead. The sealing compound bead is formed discontinuously from several segments. At least one first segment is formed by the relative movement in a first circumferential direction of the insulating glass element, and at least one second segment is formed by the relative movement in a second, opposite circumferential direction. Each connection of segments of the sealing compound bead which is situated on a longitudinal side section of the circumference of the insulating glass element is formed such that the strand of the sealing compound is applied in the region of the end of a sealing compound bead already situated in the edge joint and is formed by the relative movement away from the end.

9 Claims, 5 Drawing Sheets

(56) References Cited

FOREIGN PATENT DOCUMENTS

| EP | 1650176 A1 | 4/2006 | |
|---|---|---|---|
| KR | 10-2012-0043483 A | 5/2012 | |
| WO | 2011041806 A2 | 4/2011 | |
| WO | WO 2011041806 A2 * | 4/2011 | ........... E06B 3/6775 |

* cited by examiner

METHOD AND DEVICE FOR FILLING AN EDGE JOINT OF AN INSULATING GLASS ELEMENT WITH A SEALING COMPOUND

CROSS REFERENCE TO RELATED APPLICATIONS

This application is a continuation of International Application No. PCT/EP/2014/077174, filed on Dec. 10, 2014, which claims priority under 35 U.S.C. § 119 to German Application No. DE 102013020557.3 filed on Dec. 10, 2013, the entire contents of which are hereby incorporated by reference.

FIELD OF THE INVENTION

The invention relates to a method and an apparatus for filling an edge joint of an insulating glass element with a sealing compound, and to a control device for an apparatus for filling an edge joint of an insulating glass element with a sealing compound.

BACKGROUND

Insulating glass elements can consist of two or more glass panes and a spacer which is respectively introduced between the two mutually facing glass surfaces of two respective opposite glass panes and which forms a closed frame. Twin-pane insulating glass elements therefore comprise an edge joint which extends around the circumference of the insulating glass element, and multi-pane insulating glass elements may comprise more than one such edge joint. The edge joints of a multi-pane insulating glass element can be filled successively with a sealing compound, but they can also be sealed simultaneously (in parallel or in a staggered manner).

The glass panes which form the respective insulating glass element can be congruent or incongruent. Insulating glass elements with incongruent glass panes are known as step elements. The panes that form the insulating glass element can have rectangular shape or any arbitrary ("contoured") form. Round-arch and gable-arch shapes are usual forms of insulating glass elements which deviate from the rectangular form.

The sealing of insulating glass elements occurs in such a way that the edge joint, which remains free on the exterior circumference of the insulating glass element, is preferably fully filled with a sealing compound once the glass panes have been joined under intermediate joining of the spacer frame. The compound solidifies after the introduction.

Hot processed thermoplastic material on the basis of polyisobutylene or setting reactive material on the basis of silicone, polysulphide or polyurethane can be used as a sealing compound. It is the object of the sealing compound to provide mechanical stability to the insulating glass element in the solidified state and to suppress the diffusion of water into the cavity of the insulating glass element which is sealed by the glass panes and the spacer frames.

The insulating glass elements to be sealed can be situated in any arbitrary position during the sealing process. In the case of mechanical methods it is common practice to store the insulating glass elements to be sealed in a substantially vertical way. For explanation purposes, sealing is illustrated by reference to an example of a two-pane insulating glass element with congruent rectangular panes, which glass element is substantially held in a vertical manner. The invention can accordingly be applied to the sealing of multi-pane insulating glass elements, step elements and insulating glass elements made of contoured glass panes, and to the sealing of insulating glass elements which are mounted horizontally or obliquely.

In the case of methods which provide a manual or substantially manual introduction of the sealing material, the insulating glass element to be sealed is always mounted in a horizontal position. Auxiliary units in form of a mounting table are known for supporting the manual method, especially in the case of insulating glass panes of large format, with which the horizontally mounted insulating glass pane can be twisted about a vertical axis in the plane of the glass pane so that user need not run around the pane (see AT 364803 for example). If abutting points occur during the manual sealing which are not situated in a corner region, it is usually proceeded in such a way that after an interruption the filling of the further sealing is commenced at the end of a sealing material bead already placed in the edge joint and is continued in the same direction in which the sealing material was previously introduced. In this process, the insulating glass pane is either not moved at all or twisted at most in the horizontal plane. In the case of manual sealing, the abutting points are typically sealed in such a way that additional or excess sealing compound at the abutting point is simply pressed in or is introduced by a mixing movement of the sealing nozzle in such a way that the material mixes on either side of the abutting point. The sequence of movement of the manual method requires a high level of experience and cannot be automated or only by using very complex machinery. Furthermore, the formation of the abutting points is time-consuming and still frequently leads to air pockets. Even in the case of automatic methods, a sealing nozzle and the insulating glass element to be sealed perform a relative movement with respect to each other for filling the joint edge with sealing compound. The sealing nozzle covers the entire edge of the pane on the circumference of the sealing element and supplies a strand of sealing compound to the edge joint. If the sealing compound bead introduced into the edge joint is supplied without interruption during continuous movement of the sealing nozzle, an abutting point or a connecting point is produced which is formed by the beginning and the end of the sealing compound. Said abutting point can be situated in the region of a corner or a position which is remote from the corners.

The relative movement between the sealing nozzle and the insulating glass elements to be sealed can be produced in the following manner which is generally known:

a) The insulating glass element to be sealed can be fixed during the introduction of the sealing compound, while the sealing nozzle is actively moved around the circumferential edge of the insulating glass element. A respective apparatus is disclosed in WO 2013/056288 A2. The sealing nozzle which supplies the sealing compound can be displaced upwardly and downwardly in the vertical direction in this apparatus via a carriage on a guide beam and is pivotable and rotatable about an axis which is normal to a plane of the glass panes of the insulating glass element. The guide beam is adjustable in a plane parallel to the glass panes in such a way that the sealing nozzle can be moved around the circumferential edge of the insulating glass element held in a substantially vertical position in order to place a sealing compound bead in the straight longitudinal sections of the edge joint and the corner regions and to thus fill the edge joint. In this process, a translatory movement of the sealing nozzle along the longitudinal sections in the region of the corners is combined with pivoting movements.

b) The sealing nozzle is fixed during the sealing process and the circumferential edge of the insulating glass element to be sealed is moved past the sealing nozzle by a respective movement of the horizontally mounted insulating glass element. Such an apparatus is known from U.S. Pat. No. 8,435,367 B2.

c) The movement of the sealing nozzle is combined with the movement of the insulating glass elements to be sealed. The sealing nozzle can be moved along two parallel edge joint sections for example, while the insulating glass element to be sealed remains stationary, and the two edge joint sections which are perpendicularly thereto are filled while the sealing nozzle remains stationary, but the insulating glass element is moved along these directions.

When the sealing compound is introduced into the edge joint in a continuous movement commencing from a position in a corner region, there is only one butt joint of the sealing compound bead. Such a solution with a butt joint in the corner region and continuous introduction of the sealing compound is preferable as far as possible for reasons that will be explained below and is shown in FIG. 1, wherein reference numeral 2 designates the glass panes of the insulating glass element 1, 4 the spacer frame, 5 the remaining edge joint and 6 the sealing nozzle.

In the cases where the introduction of the sealing material into the edge joint must be interrupted for production reasons, e.g., because limited movement ranges of the sealing nozzle and/or the insulating glass element require repositioning because electrical or pneumatic lines or mechanical connections (e.g., shutters that are installed in the interior of the insulating glass element) need to be guided through the sealing compound bead, or because the resupply of the sealing material is interrupted (e.g., because a storage container for the sealing material needs to be changed), and is resumed after interruption, one or several further butt joints are produced along the circumferential edge of the insulating glass element.

Two types of butt joints can fundamentally be distinguished, which are shown in FIG. 6. On the one hand, a butt joint in which the supply of the sealing compound and the relative movement is interrupted at a specific point and the introduction of the sealing compound is recommenced at the spherical end of the material bead previously introduced into the edge joint and continued in the same direction as before, so that the end of the horizontal bead is deformed by the front of the newly introduced material, and an abutting point is formed from two material strands (butt joint of type A). The butt joint of type A can be slightly modified according to the illustration of the variant A' in the respect that the nozzle is arranged slightly rearwardly offset from the spherical end of the horizontal bead. The newly ejected material enters the material before the end of the horizontal bead and thus virtually "pushes" a small end section of the previously deposited bead in a forward direction with the advancing movement of the nozzle (see FIG. A', (iii)). For both variants, i.e. for type A and type A' of the butt joint, the formulation is selected within the scope of the disclosure of the invention that the strand of the sealing compound is attached "in the region of the end" of the material bead previously introduced into the edge joint.

An alternative type of butt joint is formed in that the sealing compound is introduced in a direction towards the end of a material bead situated in the edge joint and both the supply of the sealing material and also the relative movement is interrupted at this point (butt joint of type B). FIG. 6 illustrates in a highly schematic way the formation of the butt joint for these two principal types and the variants of type A/A'.

One problem in all butt joints is generally the possibility of air pockets in the sealing compound and insufficient mixing of the material.

In the case of butt joints of type A, the mutually meeting ends of a sealing compound strand and a sealing compound bead can usually be connected in the edge joint without any such problems, irrespective of where the abutting point is situated on the circumference of an insulating glass element. According to the illustration in FIG. 6 (A), the sealing nozzle can be moved towards the front or front end of an already deposited bead in such a way that the front or end of the bead to be newly deposited can be joined to the front of the bead that was already previously deposited, and the material at the abutting point is deformed by the successive material in such a way that the edge joint is filled with sealing compound completely and without air pockets.

Whereas this problem has substantially been solved by known methods for the case of a butt joint of type B situated in the region of a corner of the insulating glass elements to be sealed, which methods enable the complete connection of the meeting ends of the strand of the sealing compound at the butt joint without any air pockets remaining in the region of the butt joint in the interior of the sealing compound (see the spatula construction for example described in the Austrian patent application A892/2012), no method is known for the case of a butt joint of type B which is not situated in the region of a corner (when the butt joint is therefore situated in an edge joint section between two corners, wherein an edge joint section need not necessarily always be arranged in a straight way in special configurations, but can also have a specific curvature) with which the complete connection of the meeting ends of sealing compound strands without air pockets is possible in this region. According to the illustration in FIG. 6 (B), the fronts or front ends of the beads of sealing compound are spherical, so that the apexes of the beads meet each other when the front of one bead is moved towards the front of an already deposited bead for forming a butt joint of type B. If the sealing nozzle is guided slightly further beyond the meeting point and continues to emit further material, the butt joint will be pressed, but in such a way that air is enclosed between the spacer and the sealing compound.

Interruptions in the introduction of the sealing material and thus the butt joints can especially also be produced in such a way when very large insulating glass elements are to be sealed in an apparatus in which the range of movement of the sealing nozzle is smaller in one direction than the longitudinal dimensions of the insulating glass element, so that the entire length of the edge joint cannot be filled in an interruption-free manner on the respective side of the insulating glass element, at least when the insulating glass element itself stands still. In this case, the insulating glass element to be sealed must be repositioned once or several times after interruption and optional return of the sealing nozzle, i.e., it needs to be further conveyed by a respective measure so that the sealing nozzle can cover the entire length of the edge joint on the side.

The air pockets remaining in the region of the abutting points in the interior of the sealing compound have proven to be disadvantageous in practice because they reduce the mechanical stability of the cured sealing compound and the mechanical stability of the finished insulating glass element. Furthermore, air pockets in the interior of the sealing compound increase water vapor permeability of the sealing compound and thus facilitate the diffusion of water vapor into the intermediate space between the panes. Finally, these air pockets in the interior of the sealing compound are disadvantageous because condensation of water vapor can occur in the cavities formed by the air pockets, which promotes the degradation of the sealing material and can lead to leakages and material breakages.

An apparatus for the automatic filling of the edge joint of two-pane or multiple-pane insulating glass panes with a sealing compound is known from DE 2846785, comprising a pivoting device by means of which the insulating glass pane, during the introduction of the sealing compound as separate strands, is pivoted at least once about 90° over its corner situated in the rear in the transport direction, after a first and second filling nozzle have travelled at first from below to the top along the vertical edge joints situated at the front and the rear in the transport direction when the insulating glass pane is stationary, and a third filling nozzle was moved during the transport of the insulating glass pane along the upper section of the edge joint. After the pivoting, one of the filling nozzles is advanced towards the upper end of the vertical edge joint now situated at the front, or the insulating glass pane is moved to this location, whereupon the remaining edge joint is filled by a movement of the filling nozzle from top to bottom. By applying this apparatus, all butt joints of sealing compound beads are exclusively situated in the corners of the insulating glass pane, so that in this respect no problem is expected with air pockets. However, the pivoting device is difficult to realize with respect to the complexity of the apparatus, or it cannot be used at all or only within limits in the case of larger or very long insulating glass panes.

A method and an apparatus for applying a sealing compound to insulating glass panes is known from DE 69629929 T2, in which a first filling nozzle travels at first along a front joint section from bottom to top on an insulating glass pane which is stationary on a transport device. The first filling nozzle is then moved along the upper joint section and a second filling nozzle along the bottom joint section by means of the transport device under simultaneous transport of the insulating glass pane in order to fill the joint sections. Finally, the first filling nozzle is then moved along the rear joint section from top to bottom again with stationary insulating glass pane in order to fill the remaining joint section. The application of this method and this apparatus also leads to the consequence that all butt joints of sealing compound beads exclusive lie in the corners of the insulating glass pane.

An apparatus for filling an edge joint of an insulating glass pane with a sealing compound is finally known from DE 4009441 A1, which is rotatably mounted on a carriage about an axis which is normal to the insulating glass pane, which carriage is displaceable on its part parallel to the plane of the insulating glass pane along mutually perpendicular guides. This apparatus comprises a scanning finger which is arranged to travel in advance in the direction of movement for detecting the depth of the edge joint.

SUMMARY

The invention is based on the object of eliminating the disadvantages of air pockets in sealing compound beads which are the result of butt joints of the sealing material when such butt joints cannot be avoided especially in the production of large-size insulating glass elements.

The invention therefore provides a method for filling an edge joint of an insulating glass element with a sealing compound, such as the exemplary rectangular-shaped insulating glass element having longitudinal side sections and corner regions at adjacent intersecting longitudinal side sections, as illustrated in the embodiments of the present invention shown in FIGS. 2 and 3. The sealing compound is ejected as a strand from at least one nozzle into the edge joint and forms a contiguous sealing compound bead there which extends around the circumference of the insulating glass element, in that the insulating glass element and the at least one nozzle are moved relative towards each other. The sealing compound bead is formed discontinuously from several segments, of which at least one first segment is formed by the relative movement in a first circumferential direction by the insulating glass element and the at least one second segment by the relative movement in a second circumferential direction which is opposite of the first circumferential direction.

It is especially possible with the method in accordance with the invention to produce large-size insulating glass elements with apparatuses in which the edge joint cannot be filled in a continuous process with the sealing material as a result of an insufficiently large movement range, e.g. in the guidance of the sealing nozzle for example, but where an interruption in this process is necessary for the purpose of repositioning the insulating glass element. Since the sealing compound bead is assembled discontinuously from three or more segments, there is the possibility on the one hand of repositioning the insulating glass element and/or the sealing nozzle, and on the other hand there are at least three butt joints. Whereas one of these butt joints (typically the one for finalizing the sealing process) is inevitably one of type B according to the aforementioned detailed explanations, it can regularly be placed without any difficulties in the region of a corner of the insulating glass element, so that air pockets can be prevented or will not occur by conventional techniques. On the other hand, at least two further butt joints are such of type A or A' in accordance with the invention, so that in this case the problem of air pockets in the butt joints does not occur here too, even when this butt joint is implemented on a longitudinal side of the insulating glass element between the corners.

In other words, a relevant aspect of the invention is that butt joints of the sealing compound bead not situated in the corner regions of the insulating glass element are only formed in the edge joint as butt joints of type A or A'.

In accordance with the invention, any connection at the ends of the segments of the sealing compound bead which is situated in a longitudinal side section (i.e. not in a corner region of two adjacent longitudinal side sections) of the circumference of the insulating glass element is formed in such a way that the strand of the sealing compound is placed at the end of a sealing compound bead which is already situated in the edge joint and is formed by a relative movement away from said end.

Each connection is preferably situated at the ends of segments of the sealing compound bead, which is formed in such a way that the strand of the sealing compound is introduced by the relative movement towards the end of a sealing compound bead which is already situated in the edge joint (butt joint of type B), at a corner region of two adjacent longitudinal side sections of the insulating glass element.

Accordingly, the further butt joints which go beyond the mandatory butt joint of type B placed in the corner region are either arranged as abutting points of type A or A', or they are positioned in such a way that they lie in the corner regions of the insulating glass element. The additional butt joints of the sealing compound bead which are required by the repositioning of the insulating glass element are therefore of type A or A' and principally do not lie in the corner regions of the insulating glass element. Even if butt joints are required as a result of an interruption in the introduction of sealing material, they can be formed from type A or A' and on a straight or curved longitudinal side of the insulating glass element between corners.

In contrast to the known methods for filling an edge joint of an insulating glass element with a sealing compound, in which the sealing compound bead is provided in a continuous process during a relative movement between the sealing nozzle and the insulating glass element in only one circumferential direction of the insulating glass element, the method in accordance with the invention provides at least one interruption in the introduction process and a continuation of the introduction in an opposite circumferential direction, as a result of which the possibility of repositioning the sealing nozzle and/or the insulating glass element is provided and especially large-size insulating glass elements can also be processed on sealing apparatuses of smaller dimensions and with smaller movement ranges.

This advantage is also supported in such a way that preferably the insulating glass element is held in a respectively stationary manner during the filling of the edge joint with the segments of the sealing compound bead and the nozzle is moved, and the insulating glass element is repositioned at least once with respect to its position between the filling of the edge joint with the segments, preferably in a transport direction of the insulating glass element.

In the method in accordance with the invention, the starting point of the first segment of the sealing compound bead is preferably placed on a longitudinal side section of the circumference of the insulating glass element, and the second segment is also started at the starting point of the first segment.

The method in accordance with the invention can especially be used for the sealing of especially large-sized insulating glass elements, wherein multiple shifting or repositioning of the insulating glass elements and the sealing nozzle is required, in that the sealing compound bead is formed from N first segments and (N−1) second segments, wherein N is an integral number and is >2.

The insulating glass element is preferably substantially vertically mounted during the filling of the edge joint with the sealing compound according to the method in accordance with the invention, and the repositioning of the insulating glass element is carried out as a translatory movement. As a result, considerably less space is required for the apparatus than in manual methods for example, which provide horizontal mounting of the insulating glass element and a rotation in the plane of the insulating glass element.

While the method in accordance with the invention can be carried out by an apparatus which comprises only one single movable sealing nozzle, so that it needs to be repositioned several times, the method can also be realized by an apparatus in which a separate sealing nozzle is provided for each segment (or for a number of segments). In this case, the number of repositioning processes can be lower and the processing time can be shorter.

In order to enable in the method in accordance with the invention the required change in the circumferential movement of the sealing nozzle in a highly effective manner with no need for complex machinery when only one such sealing nozzle or only fewer such sealing nozzles than segments are present, the invention also provides an apparatus for filling an edge joint of an insulating glass element with a sealing compound which comprises a nozzle with an outlet opening for ejecting a strand of the sealing compound into the edge joint of the insulating glass element during a relative movement between the nozzle and an insulating glass element, and a guide element associated with the outlet opening, which guide element is formed to be guided during use on an edge of the insulating glass element and to prevent lateral escape of sealing compound introduced into the edge joint, wherein the outlet opening of the nozzle and the guide element can be formed in such a way that the strand can be introduced into the edge joint in opposite relative directions of movement.

The outlet opening and the guide element are preferably formed and arranged in a symmetrical manner in such a way that the strand can be ejected according to the opposite relative directions of movement and introduced into the edge joint. In this case, it is merely necessary to change the direction of rotation for introducing the segments in the different directions.

The guide element is preferably formed with end sections at the two opposite ends in the direction of movement, which end sections are beveled or rounded off in the manner of a blade or runner. This variant can be realized in an especially simple way, in that existing guide elements already comprise such an end section at one end which is beveled or rounded off in the manner of a ski, blade or runner, and such an end section only needs to be formed on the opposite end section. As a result, an existing sealing apparatus can be prepared in an especially simple way for carrying out the method in accordance with the invention.

It is alternatively preferably also possible to form the outlet opening and the guide element between two working positions in an adjustable, preferably pivotable, manner according to the opposite relative directions of movement. In this case, the guide element itself need not necessarily be modified, but merely the retainer thereof.

A sensor arrangement for determining the edge joint depth is frequently provided in automated sealing apparatuses in the direction of movement directly before the bow of the guide element which is formed in the manner of a ski, blade or runner. By evaluating the detected depth signal, the transported and flow quantity of sealing compound and/or the relative speed between the sealing nozzle and the insulating glass elements to be sealed can be controlled or adjusted with the objective that the edge joint is filled completely with sealing compound without excessive sealing compound emerging. In order to also enable the change in the direction of introduction of the sealing compound in accordance with the invention in such apparatuses, the sensor arrangement preferably comprises either a sensor for each of the two opposite relative directions of movement, or it comprises a sensor which can be adjusted and preferably pivoted between two working positions according to the opposite relative directions of movement.

Such a sensor is thus preferably formed by a movably mounted contact sensor whose deflection can be detected as a measure for the edge joint depth.

The invention finally also relates to a control device for an apparatus for filling an edge joint of an insulating glass element with a sealing compound, wherein the apparatus comprises a transport device for transporting the insulating glass element in one direction of transport and a movably formed device for ejecting a strand of the sealing compound into the edge joint of the insulating glass element. The control device is formed in accordance with the invention in such a way that it can trigger a driver of the transport device and the device for ejecting a strand of the sealing compound in such a way that the edge joint of the insulating glass element is filled with the sealing compound according to the previously explained method in accordance with the invention.

The method and the control apparatus in accordance with the invention are especially advantageous for producing large-size insulating glass elements of large dimensions in apparatuses if they are provided with the possibility to reposition or shift an insulating glass element once or several times and the sealing occurs in such a way that the insulating glass element is stationary during the introduction of the sealing compound and only the sealing nozzle is moved, as described above. Because the large insulating glass elements have a very high mass, it is often difficult to position the insulating glass elements in a precise and rapid manner, whereas the movement and the guidance of the lighter sealing nozzle(s) can be carried out in a comparatively simple, rapid and precise manner. This further leads to the possibility that an installation that is even designed for the sealing of large insulating glass elements can also be realized with an overall size in which insulating glass elements of this size could not be processed by using conventional sealing methods.

BRIEF DESCRIPTION OF THE DRAWINGS

The method according to the present invention will be explained below by reference to embodiments shown in the enclosed drawings, wherein.

DETAILED DESCRIPTION

Figure 1:
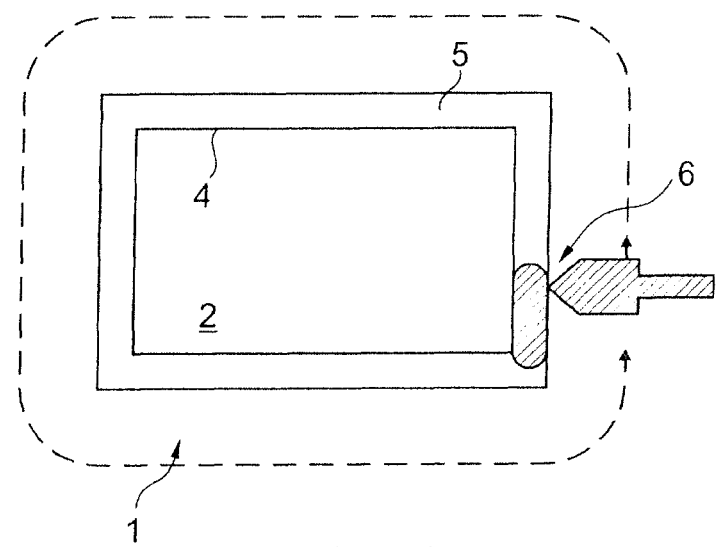
FIG. 1 generally shows the formation of a sealing compound bead on an insulating glass element in a continuous sequence.
Figure 2:
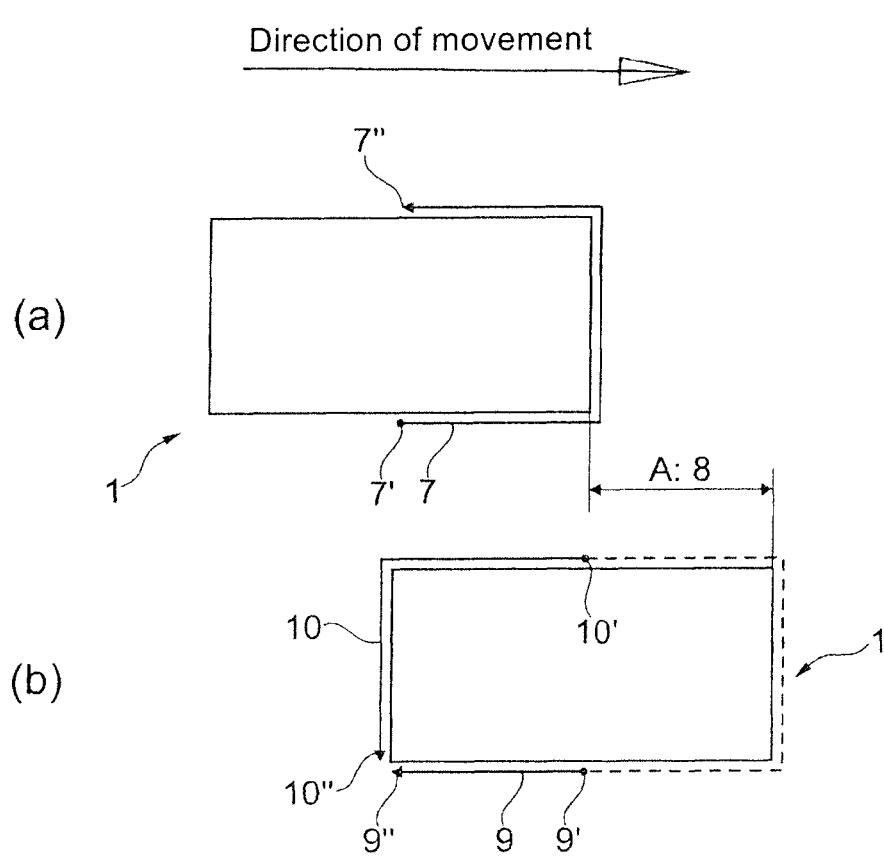
FIG. 2 shows an example of the method in accordance with the invention in which repositioning of the insulating glass element is carried out once.

In the example of the method in accordance with the invention which is schematically shown in FIG. 2, the sealing compound is introduced in three segments into the edge joint, in that the insulating glass element is repositioned once. The section 7 of the edge joint is filled at first with sealing compound commencing at position 7', in that the sealing nozzle, with stationary insulating glass element, is moved counter-clockwise around the circumference of the insulating glass element (FIG. 2a). The filling of the section 7 is terminated at position 7", so that the first segment of the sealing compound bead is introduced into the edge joint. The insulating glass element is shifted in the direction of passage over the length 8. The remainder of the edge joint not yet filled with sealing compound is subdivided into two partial sections which are filled successively with sealing compound.

The section 10 is filled at first with sealing compound because the repositioning path of the nozzle is shorter than for the section 9. The filling of the section 10 starts at position 10' as soon as the sealing nozzle has been repositioned from the end position at 7" to the starting position at 10' and ends at position 10". As a result, the second segment of the sealing compound bead has thus been introduced into the edge joint. After renewed repositioning of the sealing nozzle from the end position at 10" to the starting position at 9', the third section 9 is filled with sealing compound. The filling of the third section 9 starts at position 9' and ends at position 9"', in that the sealing nozzle is moved in a clockwise manner around the circumference of the insulating glass element (FIG. 2b). The travel of the sealing nozzle during the sealing of the sections 7 and 10 runs in a counter-clockwise manner in the illustration, whereas the travel of the sealing nozzle during the sealing of the section 9 occurs in a clockwise manner in the illustration. The repositioning of the sealing nozzle can thus be omitted to the extent that several sealing nozzles are provided. The sequence of the sealing of the sections 9 and 10 can also be exchanged.

Butt joints are produced at the positions 7"/10', 9"/10" and 7'/9'. They either lie in the region of a corner of the insulating glass element 1 (butt joint at the position 9"/10"), or it concerns butt joints of type A or A' (butt joint at the position 7"/10' and 7'/9'). That is why the formation of air pockets can be prevented in all butt joints.

Figure 3:
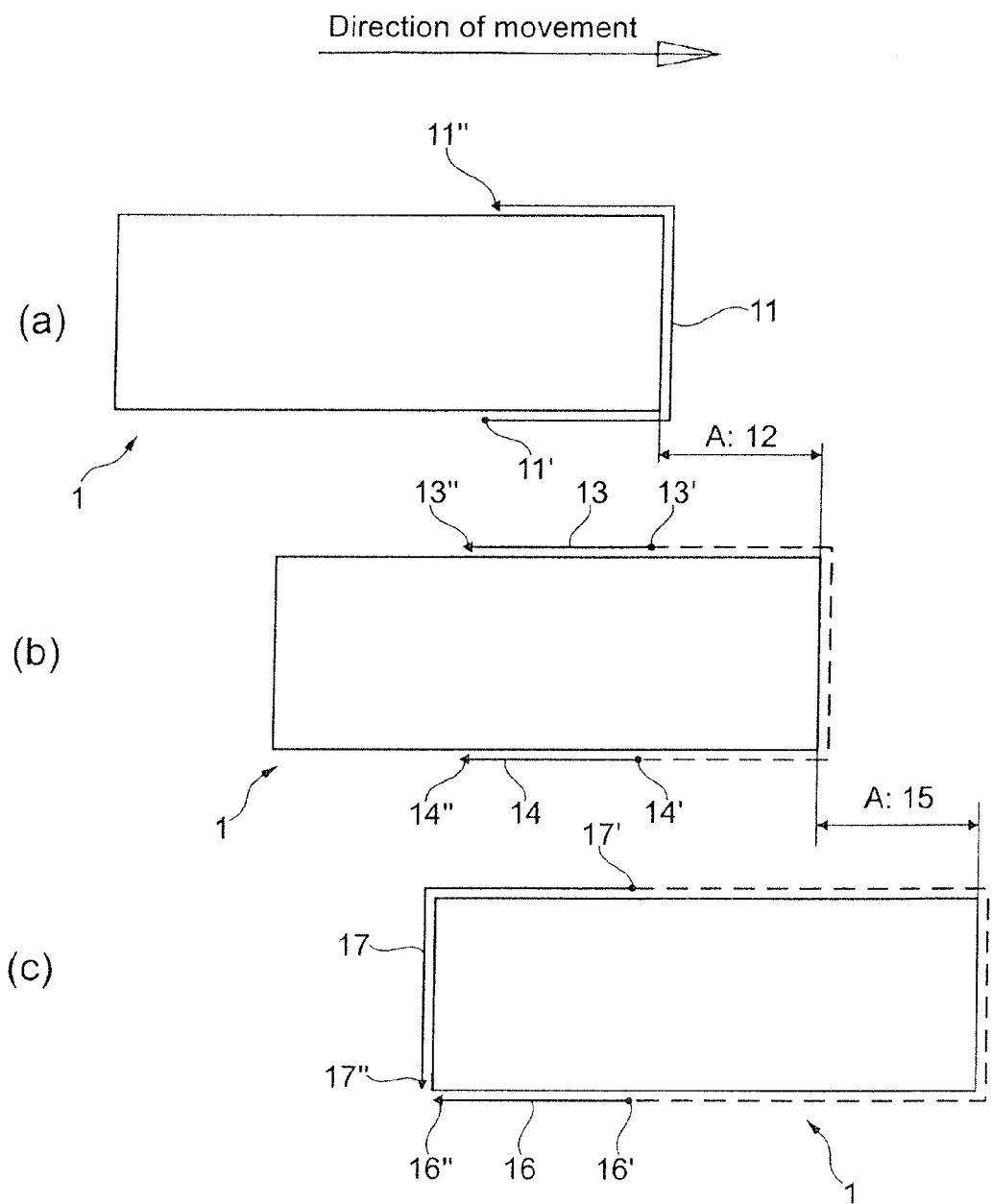
FIG. 3 shows an example of the method in accordance with the invention in which repositioning of the insulating glass element is carried out several times.

Double repositioning of the insulating glass element is carried out in the further example of the method in accordance with the invention as schematically shown in FIG. 3. The sealing compound is introduced in five segments into the edge joint in the example shown in FIG. 3, in that the insulating glass element is repositioned three times. The section 11 of the edge joint is filled at first with sealing compound, starting at position 11', in that the sealing nozzle is moved in a counter-clockwise manner around the circumference of the insulating glass element when the insulating glass element 1 is stationary (FIG. 3a). The filling of the section 11 is terminated at position 11", so that the first segment of the sealing compound bead is introduced into the edge joint.

The insulating glass element is repositioned in the direction of passage by the length 12. The remainder of the edge joint that has not yet been filled with sealing compound is divided into four subsections which are filled successively with sealing compound. The section 13 is filled at first with sealing compound after the sealing nozzle has been repositioned from the end position at 11" to the starting position at 13'. The filling of the second section 13 starts at position 13' and ends at position 13", in that the sealing nozzle is moved in the counter-clockwise direction around the circumference of the insulating glass element (FIG. 3b). The second segment of the sealing compound bead is thus introduced into the edge joint. After renewed repositioning of the sealing nozzle from the end position at 13" to the initial position at 14', the third section 14 is filled with sealing compound. The filling of the section 14 starts at position 14' and ends at position 14". The travel of the sealing nozzle during the sealing of the section 14 runs in a clockwise manner in the illustration. The third segment is thus introduced into the sealing compound bead.

The insulating glass element is then repositioned again by the length 15 in the direction of passage. The section 17 is then filled with sealing compound after the sealing nozzle has been repositioned from the end position at 14" to the initial position at 17'. The filling of the fourth section 17 starts at position 17' and ends at position 17", in that the sealing nozzle is moved in the counter-clockwise direction around the circumference of the insulating glass element (FIG. 3*c*). The fourth segment of the sealing compound bead is thus introduced into the edge joint. After renewed repositioning of the sealing nozzle from the end position at 17" to the starting position at 16', the fifth section 16 is filled with sealing compound. The filling of the section 16 starts at position 16' and ends at position 16". The travel of the sealing nozzle during the sealing of the fifth section 16 runs in a clockwise manner in the illustration. The fifth and last segment of the sealing compound bead is thus introduced into the edge joint. The repositioning of the sealing nozzle can be omitted if and when several sealing nozzles are provided. The sequence of sealing of the sections 13 to 14 as well as 17 and 16 can be exchanged.

Butt joints are produced at the positions 11"/13', 13"/17', 17"/16", 11'/14', 14"/16'. They either lie in the region of a corner of the insulating glass element 1 (butt joint at the position 17"/16") or it concerns butt joints of type A or A' (butt joint at the positions 11"/13', 13"/17', 11'/14', 14"/16'). That is why the formation of air pockets can be prevented in all butt joints.

Further alternatives of the sealing method can readily be carried out by using the principles as described above.

Figure 4:
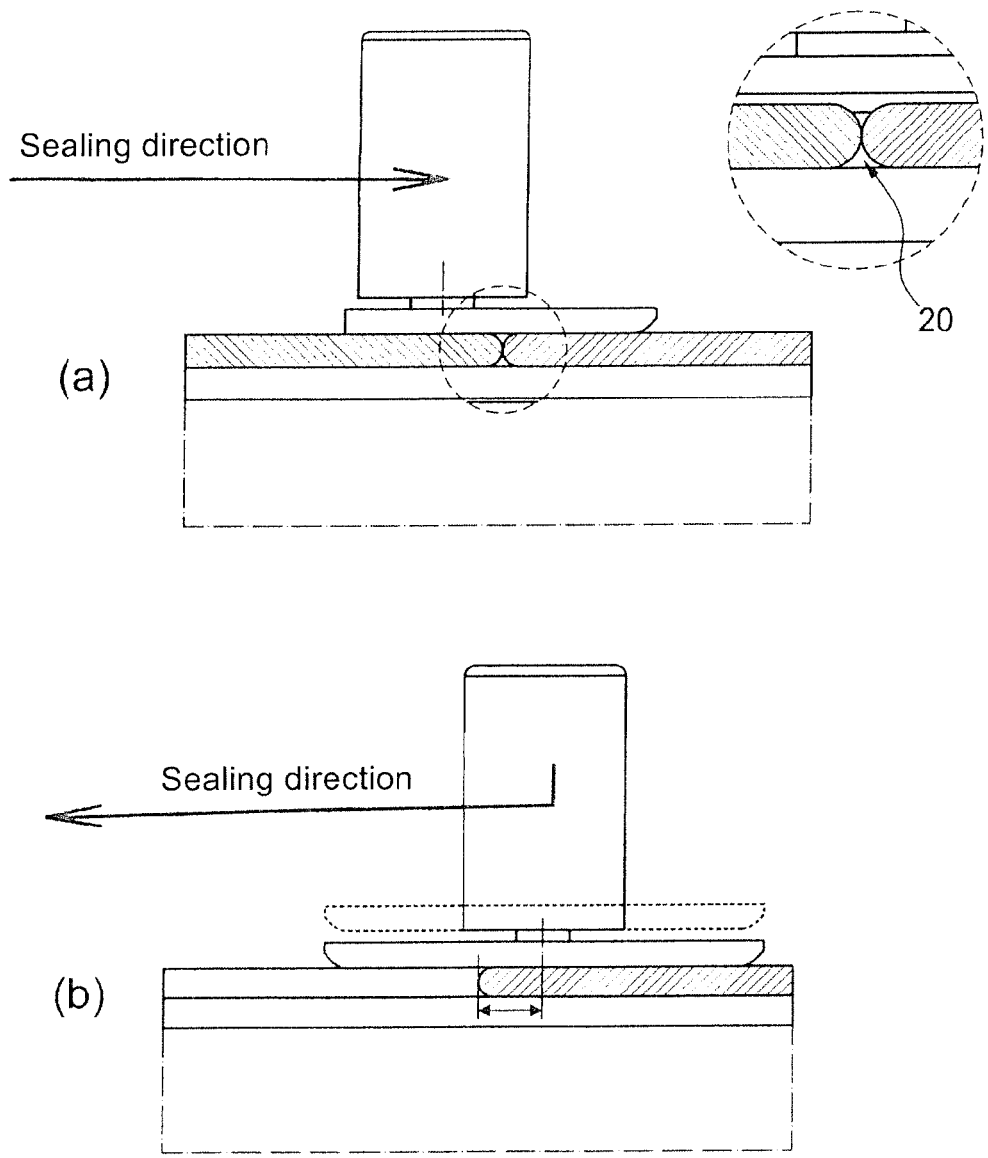
FIG. 4 shows a comparison of the formation of a butt joint of type B on a straight circumferential section with a guide device according to the prior art and the formation of a butt joint of type A on a straight circumferential section with a guide device in accordance with the invention.

FIG. 4 shows a comparison of the formation of a butt joint of type B on a straight circumferential section with a guide device according to the state of the art (FIG. 4*a*) and the formation of a butt joint of type A or A' on a straight circumferential section with a guide device in accordance with the invention (FIG. 4*b*). The guide device shown in FIG. 4*a* comprises only one end section which is situated at the front in the direction of movement or sealing and which is beveled or rounded off in the manner of a ski, blade or runner. The segment (on the left in the illustration) which is currently formed by ejection of sealing compound from the nozzle is adjacent to the segment of the sealing compound bead (on the right in the illustration) which is already situated in the edge joint, in that the strand moves towards the same. Such a butt joint is obtained for example when the sealing device has performed a complete circuit around the circumference of an insulating glass element in one circumferential direction and meets the initial part of the bead again. As described above, the likelihood of formation of air pockets within the sealing compound occurs in this butt joint, which is indicated in the detailed enlargement 1, when the butt joint is not situated in a corner region.

The guide device shown in FIG. 4*b* according to the invention is provided with the end sections which are beveled or rounded off in the manner of a ski, blade or runner in order to allow performing the change in direction of the sealing in a simple manner and is preferably arranged symmetrically. The downstream segment of the sealing compound bead (relating to the direction of sealing) is adjacent to the end region of the bead which is already situated in the edge joint, wherein the butt joint can be arranged as such a one of type A or A' (the nozzle position for type A' is indicated in FIG. 4*b*), and leads away therefrom during alternating direction of sealing. As has already been described, the risk of the formation of air pockets 20 (see FIG. 4*a*) within the sealing compound can be prevented, even when such a butt joint lies on a straight longitudinal section of a side and thus not in a corner region of the insulating glass element.

Figure 5:
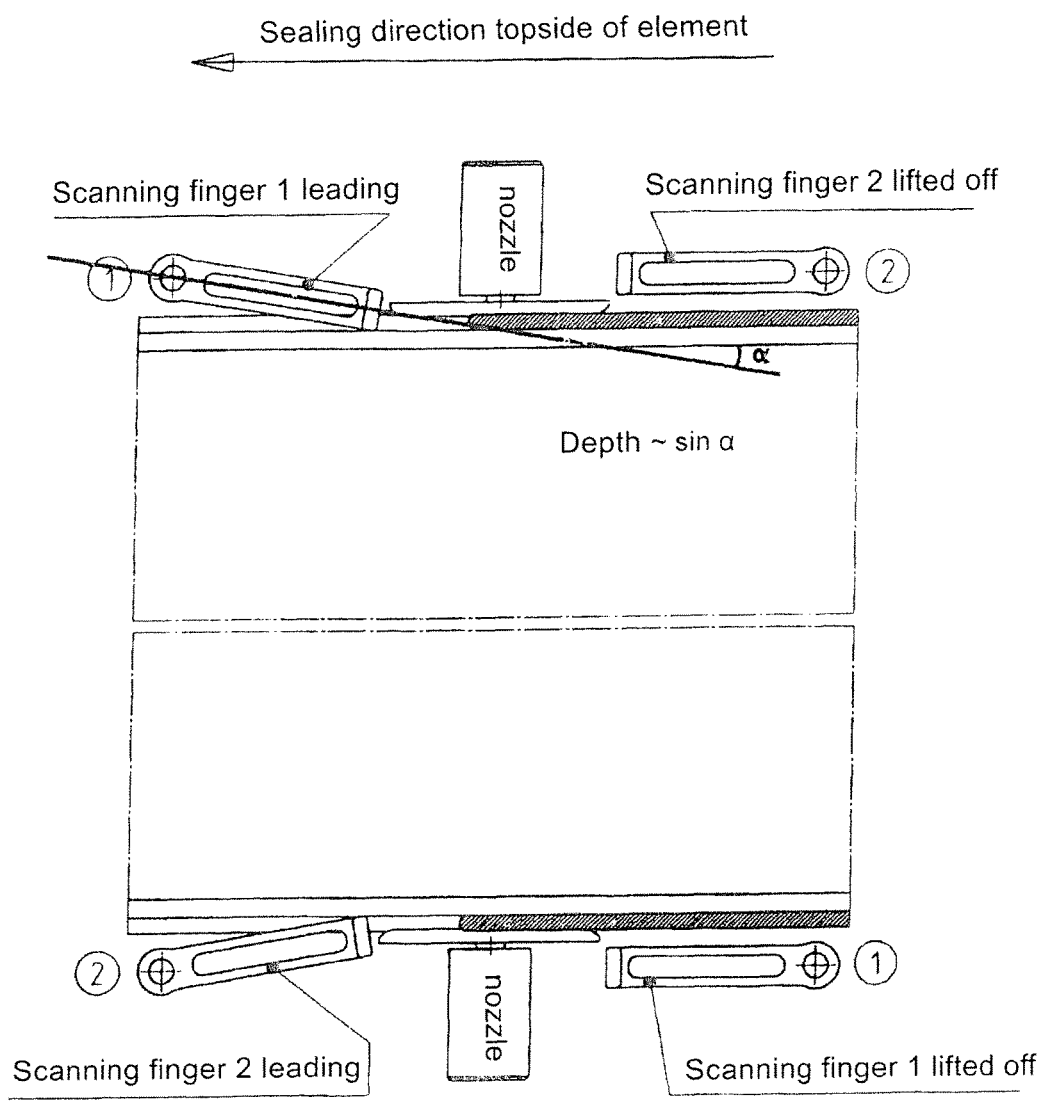
FIG. 5 shows an apparatus in accordance with the invention with a symmetric sealing nozzle and with scanning fingers which can be changed according to the respective direction of movement.
Figure 6:
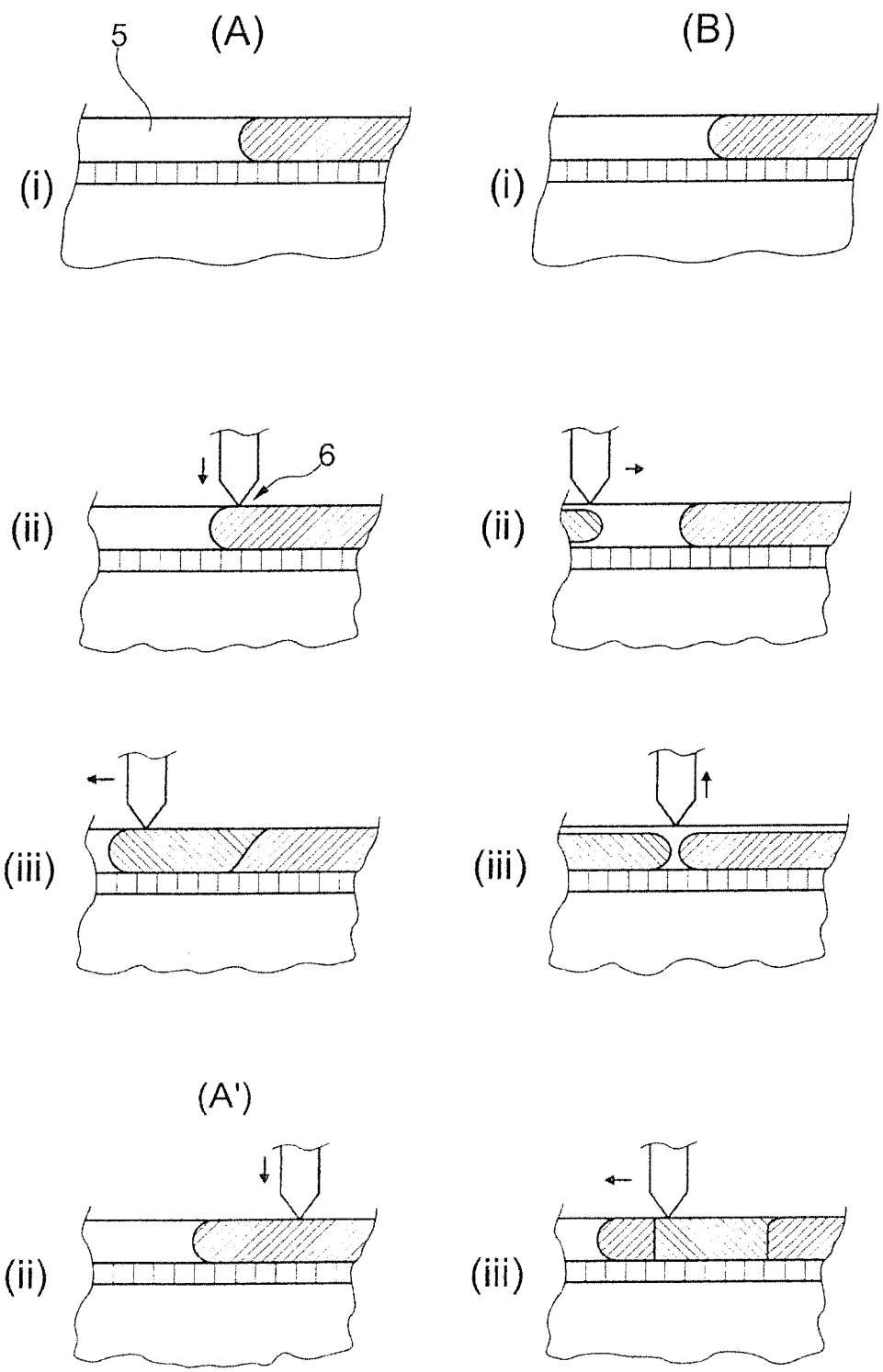
FIG. 6 shows the formation of different butt joints of a sealing compound bead according to the type A, A' and according to type B.

FIG. 5 finally shows an apparatus in accordance with the invention with symmetric sealing nozzle as in FIG. 4 and with symmetrically arranged scanning fingers which can be repositioned according to the direction of movement by rotation or pivoting about a rotational axis to a working position. The rotational axis of the depth sensor can be guided at a defined distance from the edge of the insulating glass element to be sealed on a frame (not shown) of the sealing device, so that the end of the scanning finger can slide in the working position over the outwardly facing surface of the spacer before the sealing nozzle. With known length of the scanning finger and the position of the rotational axis, the depth of the edge joint can be calculated from the angle of inclination of the scanning finger via trigonometric functions and said information can then be used for controlling the sealing compound supply and/or the relative speed between the sealing nozzle and the insulating glass element.

What is claimed is:

1. A method for filling an edge joint of an insulating glass element with a sealing compound, comprising:
   expelling the sealing compound as a bead from at least one nozzle, moving relative to the insulating glass element, into the edge joint to form there a contiguous sealing compound bead extending around the circumference of the insulating glass element, wherein forming the sealing compound bead comprises:
   forming the sealing compound bead discontinuously from several segments connected at connections of segments by forming at least one first segment by the relative movement in a first circumferential direction of the insulating glass element and forming at least one second segment by the relative movement in a second circumferential direction which is opposite to the first circumferential direction;
   forming each connection of segments of the sealing compound bead that is situated on a longitudinal side section not adjacent to a corner region of the circumference of the insulating glass element such that a strand of the sealing compound is applied in a region of an end of a sealing compound bead already situated in the edge joint and is formed by the relative movement away from said end of the sealing compound bead already situated in the edge joint; and
   situating each connection of segments of the sealing compound bead that is formed such that the strand of the sealing compound is introduced by the relative movement towards the end of a sealing compound bead already situated in the edge joint, in a corner region of two adjacent longitudinal side sections of the insulating glass element.

2. The method according to claim 1, wherein the insulating glass element is respectively held in a stationary manner during the filling of the edge joint with the segments of the sealing compound bead and the nozzle is moved, and wherein the insulating glass element, between the filling of the edge joint with the segments, is repositioned at least once in a transport direction of the insulating glass element.

3. The method according to claim 2, wherein a starting point of the first segment of the sealing compound bead lies on a longitudinal side section of the circumference of the insulating glass element, and the second segment also commences in the region of the starting point of the first segment.

4. The method according to claim 2, wherein the sealing compound bead is formed from N first segments and (N−1) second segments, where N is an integer greater than two.

5. The method according to claim 2, wherein the first and second segments of the sealing compound bead are formed by the same nozzle or respectively by separate nozzles.

6. The method according to claim 1, wherein a starting point of the first segment of the sealing compound bead lies on a longitudinal side section of the circumference of the insulating glass element, and the second segment also commences in the region of the starting point of the first segment.

7. The method according to claim 1, wherein the sealing compound bead is formed from N first segments and (N−1) second segments, where N is an integer greater than two.

8. The method according to claim 1, wherein the first and second segments of the sealing compound bead are formed by the same nozzle or respectively by separate nozzles.

9. The method according to claim 2, wherein the insulating glass element is mounted in a substantially vertical way during the filling of the edge joint with the sealing compound and the repositioning of the insulating glass element is carried out as a translatory movement.

\* \* \* \* \*